(12) United States Patent
Lin

(10) Patent No.: US 12,422,012 B2
(45) Date of Patent: Sep. 23, 2025

(54) SHOCK-ABSORBING BUFFER PAD

(71) Applicant: San Shiang Technology Co., Ltd., Tainan (TW)

(72) Inventor: Ming Yang Lin, Tainan (TW)

(73) Assignee: San Shiang Technology Co., Ltd., Tainan (TW)

( * ) Notice: Subject to any disclaimer, the term of this patent is extended or adjusted under 35 U.S.C. 154(b) by 0 days.

(21) Appl. No.: 17/793,456

(22) PCT Filed: Sep. 16, 2021

(86) PCT No.: PCT/CN2021/000185
§ 371 (c)(1),
(2) Date: Jul. 18, 2022

(87) PCT Pub. No.: WO2023/039687
PCT Pub. Date: Mar. 23, 2023

(65) Prior Publication Data
US 2024/0183421 A1  Jun. 6, 2024

(51) Int. Cl.
*F16F 7/08* (2006.01)
*A47C 27/06* (2006.01)
(Continued)

(52) U.S. Cl.
CPC ............ *F16F 7/082* (2013.01); *A47C 27/061* (2013.01); *F16F 1/371* (2013.01); *F16F 7/09* (2013.01);
(Continued)

(58) Field of Classification Search
CPC .. F16F 1/371; F16F 1/373; F16F 1/377; F16F 1/3615; F16F 7/082; F16F 7/09; A47C 27/061
(Continued)

(56) References Cited

U.S. PATENT DOCUMENTS 2,842,784 A * 7/1958 Grund .................. A47C 27/061
5/936
3,608,107 A * 9/1971 Kentor ................. A47C 27/061
267/89
(Continued)

FOREIGN PATENT DOCUMENTS

| CN | 101095586 A | 1/2008 |
| CN | 102119817 A | 7/2011 |

(Continued)

*Primary Examiner* — Thomas J Williams
(74) *Attorney, Agent, or Firm* — Best & Flanagan LLP

(57) ABSTRACT

The shock-absorbing buffer pad comprises an external compression body, an internal guide slot and an inserted adjusting component. The external compression body has a top part, a bottom part and a compression elastic component. The top part is configured with an inserting hole. The bottom part is located beneath the top part. The compression elastic component is connected between the top part and the bottom part. The compression elastic component has a folding part. When the top part is pressed, the compression elastic component will accumulate an inverse elastic force. The internal guide slot is formed on the bottom part of the external compression body and located inside the internal space of the external compression body. The internal guide slot has an inserting slot exposing upward. The interior of the inserting slot is formed with a stopping block. The inserted adjusting component has an inserting cylinder, which can be inserted into the inserting hole. The top surface of the inserting cylinder is positioned outside the inserting hole. The bottom part of the inserting cylinder is divided into multiple abutting walls corresponding to the stopping block.

8 Claims, 14 Drawing Sheets

(51) Int. Cl.
*F16F 1/371* (2006.01)
*F16F 1/373* (2006.01)
*F16F 7/09* (2006.01)

(52) U.S. Cl.
CPC ......... *F16F 1/373* (2013.01); *F16F 2230/007* (2013.01); *F16F 2236/027* (2013.01)

(58) Field of Classification Search
USPC .......... 267/33, 35, 89, 152, 153, 292, 140.4; 248/565, 566, 575, 633
See application file for complete search history.

(56) References Cited

U.S. PATENT DOCUMENTS

| | | | | |
|---|---|---|---|---|
| 5,052,652 | A | * | 10/1991 | Sevilleja .................. F16F 1/377 267/141 |
| 5,467,970 | A | * | 11/1995 | Ratu ........................ B60G 7/04 267/152 |
| 2019/0133334 | A1 | | 5/2019 | Kho |
| 2024/0183421 | A1 | * | 6/2024 | Lin .......................... F16F 7/082 |

FOREIGN PATENT DOCUMENTS

| | | |
|---|---|---|
| CN | 202104587 U | 1/2012 |
| CN | 202146110 U | 2/2012 |
| CN | 208550657 U | 3/2019 |
| KR | 20170069620 A | 6/2017 |
| TW | M419478 U | 1/2012 |

* cited by examiner

SHOCK-ABSORBING BUFFER PAD

BACKGROUND OF INVENTION

The present invention relates generally to a shock-absorbing buffer pad, and more particularly to a shock-absorbing buffer pad with adjustable hardness.

To improve the softness of the bottom part of a pad, a product called "shock-absorbing buffer pad" is usually used on the bottom part of the pad body or inside the pad body, to support the pad body, increase the softness and improve the comfort. For example, in early times, people sleep on wooden board beds or tatami bed. In order to improve the comfort, a thin sleeping pad (such as a Japanese-style sleeping pad) is laid on the wooden board bed or the tatami bed. However, even though the thin sleeping pad provides better softness than sleeping directly on the wooden board bed or tatami bed, it is still not soft and comfortable enough for the sleeper. Therefore, a spring mattress is developed. The product is made by installing springs inside the mattress to greatly increase the softness and comfort. For the mattress, the "spring" is an object similar to the "shock-absorbing buffer pad".

In early times, during outdoor camping, a waterproof pad is laid on the ground before setting up the tent, so that a sleeping bag can be used inside the tent for sleeping. However, the waterproof pad is too hard for sleeping. Later, a soft pad is used inside the tent for better comfort when sleeping inside the sleeping bag. This soft pad can help reduce the feeling of hardness. Apart from outdoor camping, nowadays more and more people use the car as a sleeping room. They drive to an outdoor environment and sleep right inside the car over night. Some people alter the internal space of the car to adapt to home life. This is becoming more and more trendy. When altering the internal space of a vehicle, generally wooden supporting boards are used as the base layer for sleeping. Then a sleeping pad, or a soft pad, or an air mattress is laid on the wooden board to increase the comfort for sleeping. Along with the increasing popularity of in-car sleeping, a "shock-absorbing buffer pad" is developed. The prior-art shock-absorbing buffer pad is a small object. In actual use, an array of the product is placed on the wooden board base layer, so that the wooden board base layer is covered by multiple shock-absorbing buffer pads. Then, a soft pad is laid above the multiple shock-absorbing buffer pads. Thus, when compressed, the multiple shock-absorbing buffer pads can provide an elastic force, providing better comfort for sleeping. It is a truly good product for outdoor sleeping.

However, the structure of the prior-art shock-absorbing buffer pad can only provide one compression stroke, and therefore can only provide one hardness. In other words, the compression stroke of the prior-art shock-absorbing buffer pad cannot be adjusted to change the hardness. Thus, when a plurality of shock-absorbing buffer pads are distributed, the hardness at a particular area cannot be adjusted to increase comfort. This is the biggest shortcoming of the prior-art shock-absorbing buffer pad.

SUMMARY OF THE INVENTION

In view of the shortcoming that the compression stroke of the prior-art shock-absorbing buffer pad cannot be adjusted to change the hardness, the instant inventor has proceeded in research and development and expects to provide a solution to enable adjustment of the compression stroke to change the hardness of the shock-absorbing buffer pads. The present invention has been finally accomplished after long-term research, design, and development, as well as numerous tests.

Accordingly, it is an object of the present invention to provide a shock-absorbing buffer pad with adjustable compression stroke to change the hardness.

To achieve the above-mentioned object, the present inventor has developed a special shock-absorbing buffer pad comprising an external compression body, an internal guide slot, and an inserted adjusting component, wherein the external compression body has a top part, a bottom part, and a compression elastic component, the center of the top part is configured with an inserting hole going downward, the bottom part is correspondingly located beneath the top part, the compression elastic component is connected between the top part and the bottom part, the middle section of the compression elastic component has a part folding inward, when the top part is pressed under an external force, the compression elastic component immediately accumulates an inverse elastic force, the internal guide slot is formed on the top surface of the bottom part of the external compression body, and is located inside the internal space of the external compression body, the internal guide slot has an inserting slot exposing upward, one of the internal walls of the inserting slot is formed with a stopping block, the inserted adjusting component has an inserting cylinder, which can be correspondingly inserted into the inserting hole of the top part, the op surface of the inserting cylinder is positioned around the inserting hole, the bottom part of the inserting cylinder is divided into multiple abutting walls, the multiple abutting walls correspond to the stopping block.

According to the above-mentioned shock-absorbing buffer pad, the top part of the external compression body is hexagonal, the center of the top part around the inserting hole has a hexagonal concave positioning slot, the inserting hole is also hexagonal, the bottom part of the external compression body is a hexagonal plane, with its center configured with a connecting hole, each side of hexagonal bottom part corresponds to each side of the hexagonal top part.

According to the above-mentioned shock-absorbing buffer pad, the top surface of the inserted adjusting component is hexagonal, the top cap can be correspondingly held inside the positioning slot of the top part and be positioned, the outer wall of one side of the positioning slot of the top part is configured with an indicator, the internal edge of each side of the top cap is marked with a number, the inserting slot of the internal guide slot has a hexagonal cross section, one of the internal walls is formed with the stopping block, the stopping block and the indicator located above are aligned in the same straight line.

According to the above-mentioned shock-absorbing buffer pad, the central wall of the top cap of the inserted adjusting component is concave and is transversely configured with a gripping rod for gripping.

According to the above-mentioned shock-absorbing buffer pad, an tipper position of the stopping block is formed with a slightly convex positioning block, an upper position outside the abutting wall is configured with a bar-shaped and slightly concave positioning hole, the concave position and depth of the positioning hole correspond to the convex position and height of the positioning block.

According to the above-mentioned shock-absorbing buffer pad, the abutting walls of the inserting cylinder bottom part are divided into first abutting wall, second abutting wall, third abutting wall, fourth abutting wall, fifth abutting wall, and sixth abutting wall, the first abutting wall has the lowest position, and the positions rise sequentially, until the highest position of the sixth abutting wall.

According to the above-mentioned shock-absorbing buffer pad, the bottom part of the inserting cylinder is divided into multiple abutting walls, which respectively corresponds to a number marked on the internal edge of each side of the top cap.

According to the above-mentioned shock-absorbing buffer pad, the abutting walls on the bottom part of the inserting cylinder can be divided into first abutting wall, second abutting wall, third abutting wall, fourth abutting wall, fifth abutting wall, and sixth abutting wall, each abutting wall respectively corresponds to a number marked on the internal edge of each side of the top cap.

According to the above-mentioned shock-absorbing buffer pad, the top part and bottom part of the external compression body are not limited in their shapes.

REFERENCE NUMERALS IN DRAWING FIGURES

Figure 1:
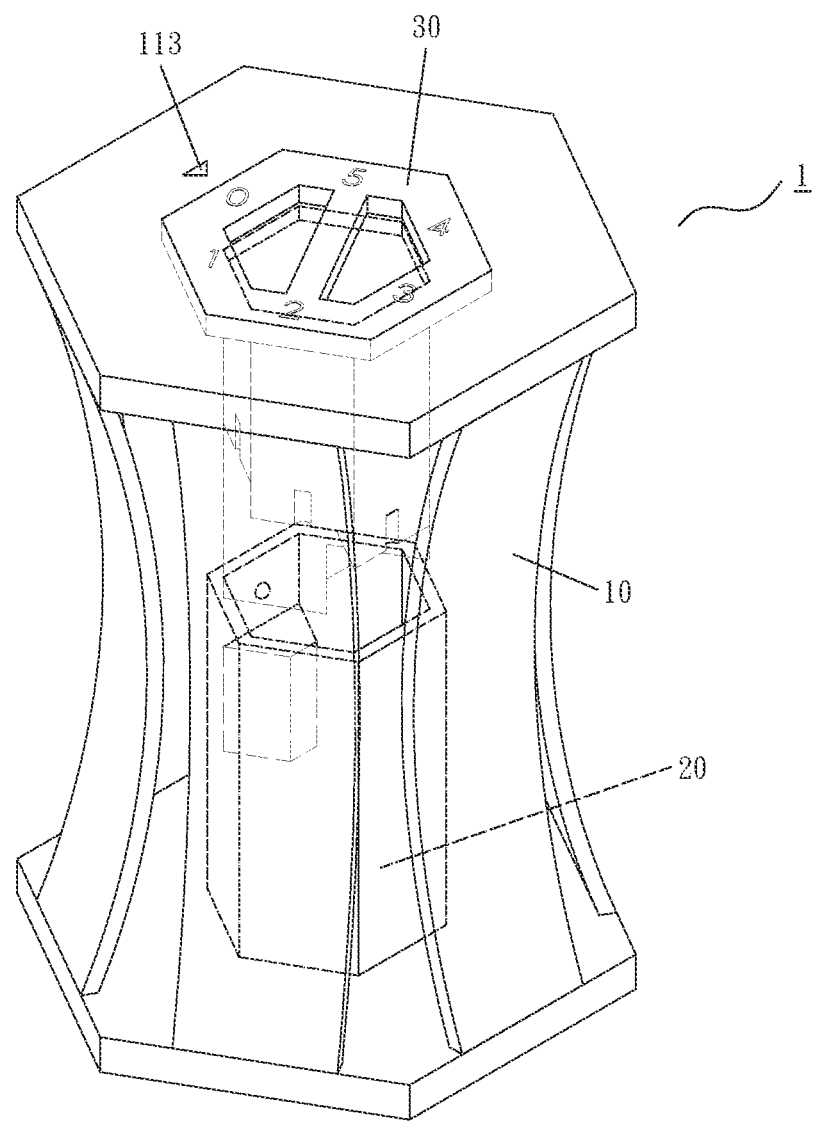
FIG. 1 is a perspective view of the invention.
Figure 2:
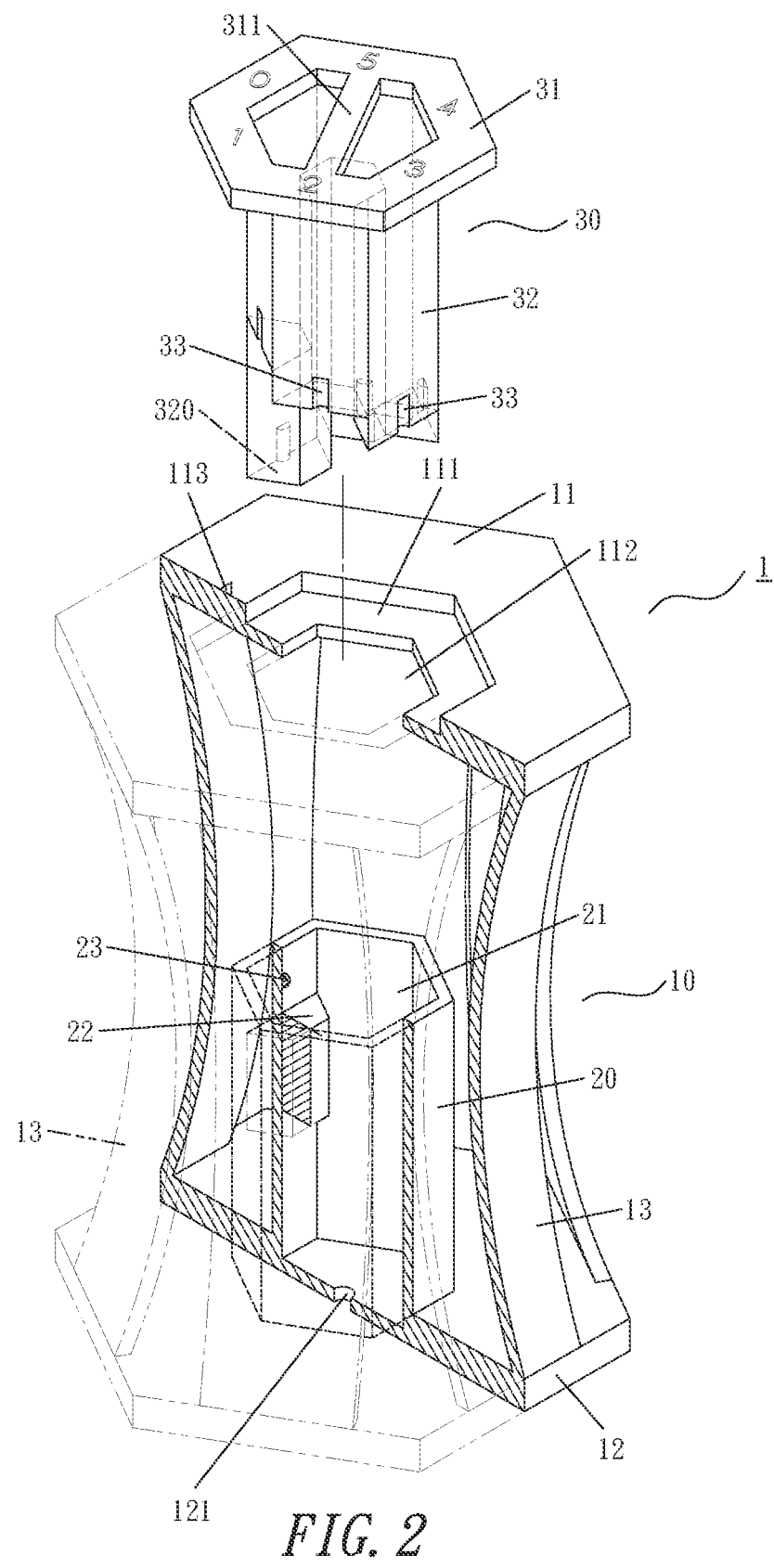
FIG. 2 is a high-angle exploded perspective view of the invention.

1 Shock-absorbing buffer pad
10 External compression body
11 Top part
111 Positioning slot
112 Inserting hole
113 Indicator
12 Bottom part
121 Connecting hole
13 Compression elastic component
20 Internal guide slot
21 Inserting slot
22 Stopping block
23 Positioning block
30 Inserted adjusting component
31 Top cap
311 Gripping rod
32 Inserting cylinder
320 First abutting wall
325 Second abutting wall
324 Third abutting wall
323 Fourth abutting wall
322 Fifth abutting wall
321 Sixth abutting wall
33 Positioning hole
40 Base layer
41 Connecting component
42 Adhesive component
Hnor Height
H320 Height
H325 Height
H324 Height
H323 Height
H322 Height
H321 Height

DETAILED DESCRIPTION OF EMBODIMENTS OF THE INVENTION

For better understanding of the technical means of the invention to realize the above object and its functions and benefits, descriptions are provided in detail below with respect to a preferred embodiment and with reference to the accompanying drawings.

Referring to FIG. 1~FIG. 6, the present invention is a shock-absorbing buffer pad 1, made up of an external compression body 10, an internal guide slot 20, and an inserted adjusting component 30, wherein, the external compression body 10 has a hexagonal top part 11, a hexagonal bottom part 12, and a compression elastic component 13 configured separately and connected to between the edges of the top part 11 and bottom part 12. The center of the top part 11 has a hexagonal concave positioning slot 111, with its center configured with a hexagonal inserting hole 112 going downward. The outer wall of one side of the positioning slot 111 is configured with an indicator 113 (see FIG. 1, FIG. 2). The bottom part 12 is located beneath the top part. The bottom part 12 is a hexagonal plane with all of its sides corresponding to the sides of the top part 11. The center of the bottom part 12 is provided with a connecting hole 121. The compression elastic component 13 is configured separately and connected between the edges of the top part 11 and bottom part 12. The middle section of the compression elastic component 13 has a part designed to fold inward (or tilt inward). When the top part 11 is pressed under an external force, the in-ward folding or tilting phenomenon of the compression elastic component 13 is increased, so that the overall height of the external compression body 10 is reduced, and the compression elastic component 13 accumulates an inverse elastic force. When the external force disappears, due to the inverse elastic force of the compression elastic component 13, the external compression body 10 immediately recovers to its original height and state.

The internal guide slot 20 is formed on the top surface of the bottom part 12, and defined inside the internal space of the external compression body 10. The internal guide slot 20 has an inserting slot 21 going upward. The cross section of the inserting slot 21 is hexagonal. Inside the slot, one of the walls is formed with a stopping block 22. The stopping block 22 and the indicator 113 located above are aligned in the same straight line. A slightly convex positioning block 23 is formed above the stopping block 22.

Figure 3:
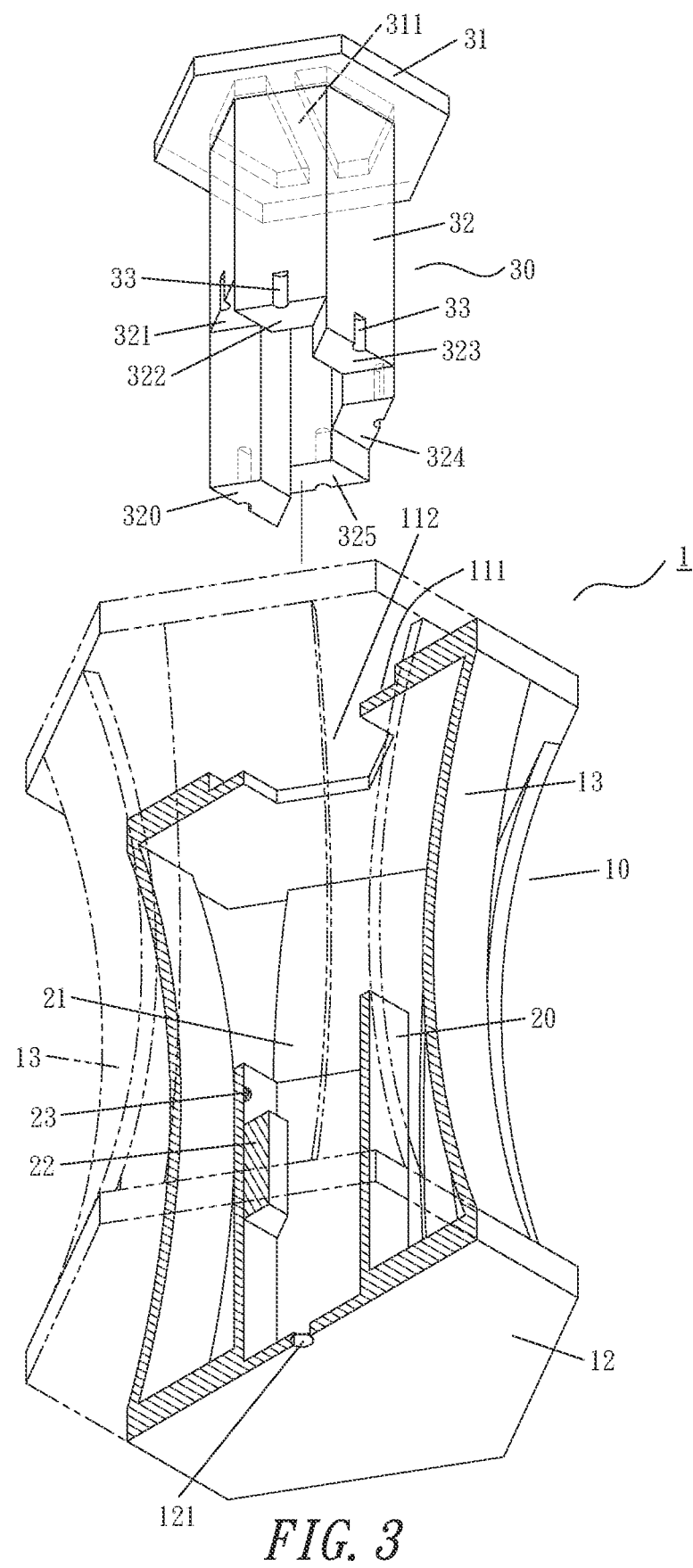
FIG. 3 is a low-angle exploded perspective view of the invention.
Figure 4:
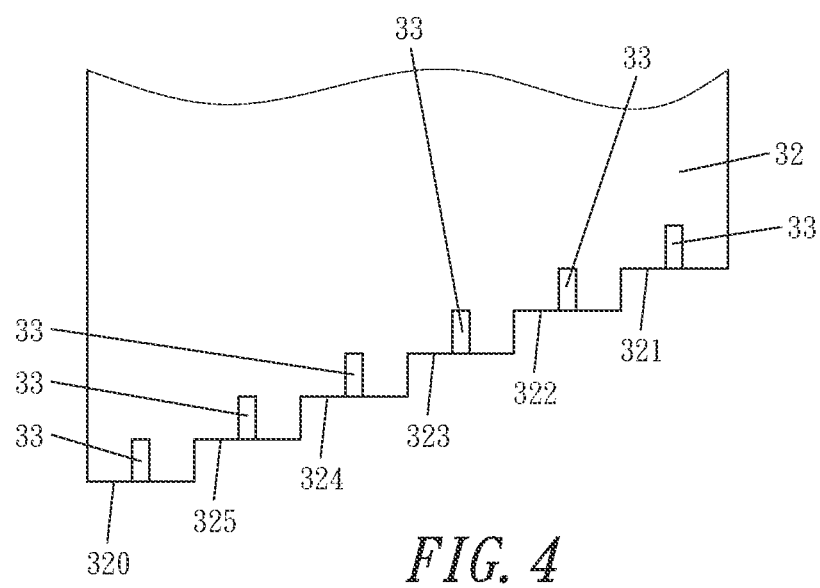
FIG. 4 is a flat pattern of the outer wall of the inserted adjusting component of the invention.
Figure 5:
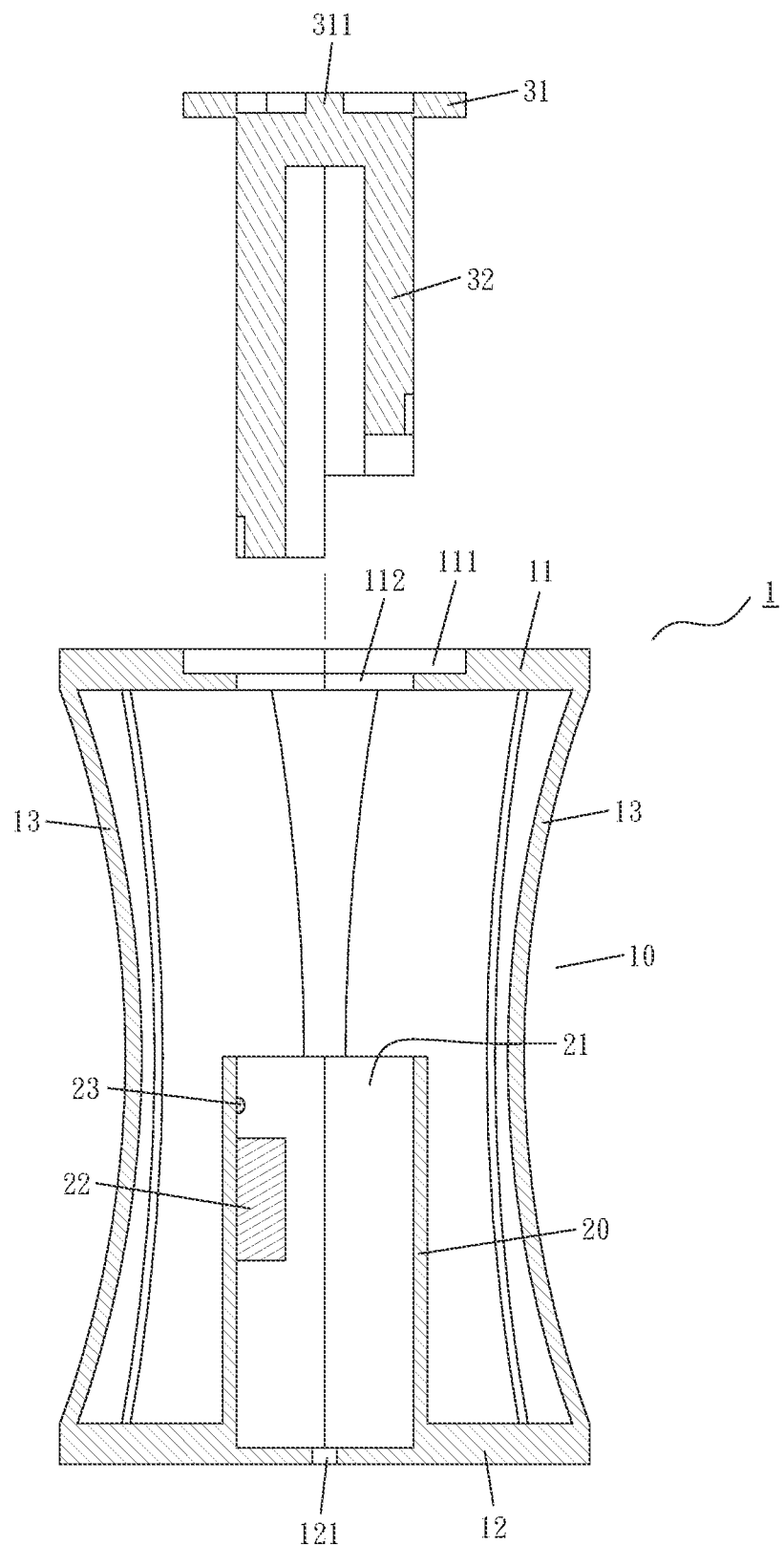
FIG. 5 is a lateral-angle exploded view of the invention.

The top surface of the inserted adjusting component 30 is hexagonal and can be held inside the top cap 31 located in the positioning slot 111. The internal edges of the six sides of the top cap 31 are respectively marked with six numbers, namely "0", "5" "4", "3", "2", "1" (see FIG. 1, FIG. 2). The central wall of the top cap 31 is concave and is configured transversely with a gripping rod 311 for gripping. The bottom surface of the top cap 31 is formed with an inserting cylinder 32 with a hexagonal cross section and which can be inserted into (through) the inserting hole 112. Referring to FIG. 3, FIG. 4, the bottom part of the inserting cylinder 32 is surrounded with staged abutting walls. Clockwise, they are respectively named as first abutting wall 320, second abutting wall 325, third abutting wall 324, fourth abutting wall 323, fifth abutting wall 322 and sixth abutting wall 321. In particular, the height of the first abutting wall 320 is largest (i.e., its location is lowest), then the location rises sequentially, until the smallest height of the sixth abutting wall 321 (i.e., its location is highest). The cross section of each abutting wall 320, 325, 324, 323, 322, 321 matches that of the stopping block 22. Then, at an upper position outside each abutting wall 320, 325, 324, 323, 322, 321, a bar-shaped and slightly concave positioning hole 33 is provided. The concave position and depth of the positioning hole 33 matches the convex position and height of the positioning block 23. It is specifically configured and noted that, the first abutting wall 320 goes straight upward and corresponds to the internal peripheral edge of the top cap 31 marked with the number "0", the second abutting wall 325 goes straight upward and corresponds to the internal peripheral edge of the top cap 31 marked with the number "5", the third abutting wall 324 goes straight upward and corresponds to the internal peripheral edge of the top cap 31 marked with the number "4", the fourth abutting wall 323 goes straight upward and corresponds to the internal peripheral edge of the top cap 31 marked with the number "3", the fifth abutting wall 322 goes straight upward and corresponds to the internal peripheral edge of the top cap 31 marked with the number "2", the sixth abutting wall 321 goes straight upward and corresponds to the internal peripheral edge of the top cap 31 marked with the number "1".

Figure 6:
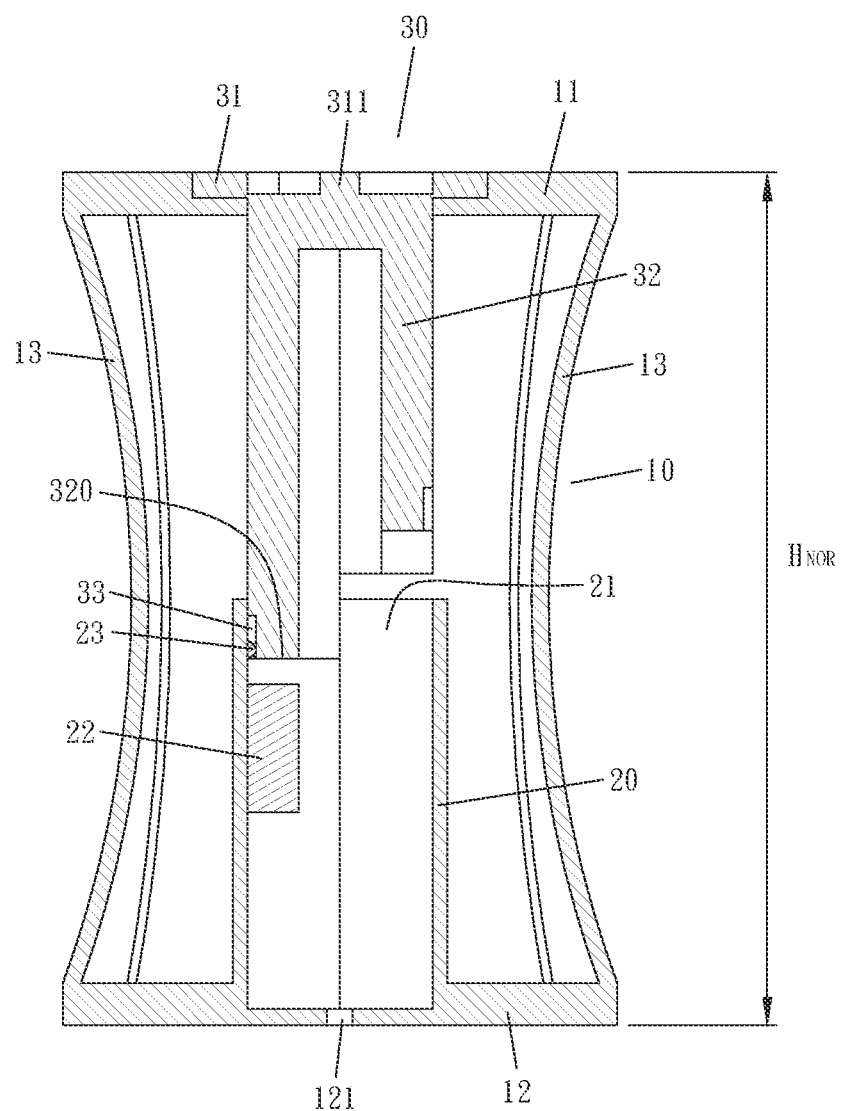
FIG. 6 is a lateral-angle sectional view of the invention not in use.

Based on the above structure, when producing the external compression body 10 and the internal guide slot 20, it is recommended that they are made as an integral body. The inserted adjusting component 30 is formed separately. Then, during assembly, the inserting cylinder 32 of the inserted adjusting component 30 is inserted from the inserting hole 112 on the top part 11 into the internal space of the external compression body 10, until the top cap 31 of the inserted adjusting component 30 is stopped inside the hexagonal concave positioning slot 111 and fixed. By now, the unused state of the overall shock-absorbing buffer pad 1 is as shown in FIG. 6. As the shock-absorbing buffer pad 1 is not pressed by an external force at this time, there is still some space between the staged abutting walls 320, 325, 324, 323, 322, 321, particularly the first abutting wall 320 with the largest height (i.e., lowest location), on the bottom part of the inserting cylinder 32, and the stopping block 22 of the internal guide slot 20, they are not contacting each other. The overall height record of the shock-absorbing buffer pad 1 at this point is set as Hnor, and the height H-nor is the overall maximum height, or normal height, of the shock-absorbing buffer pad 1.

Figure 7A:
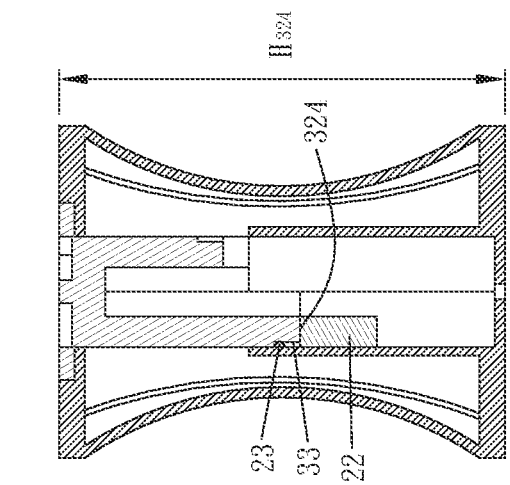
FIG. 7(a)~FIG. 7(f) are lateral-angle sectional view of different usage states of the invention when turning the inserted adjusting component.
Figure 7B:
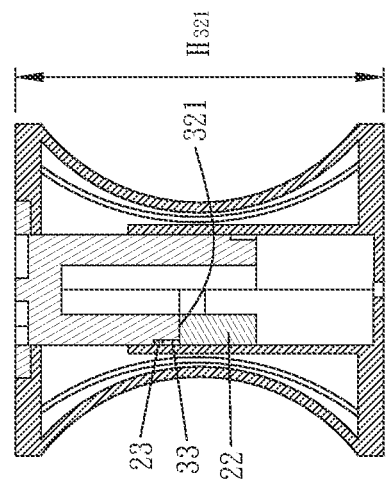
Figure 7C:
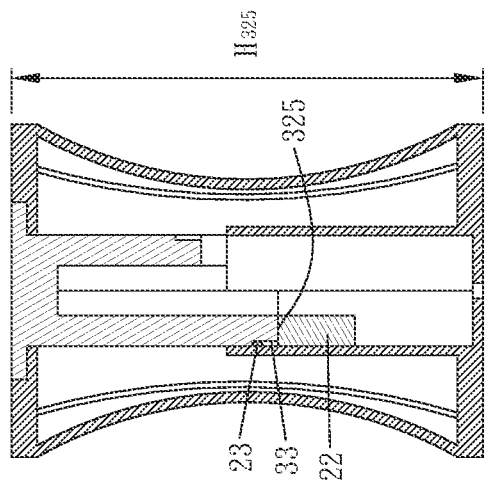
Figure 7D:
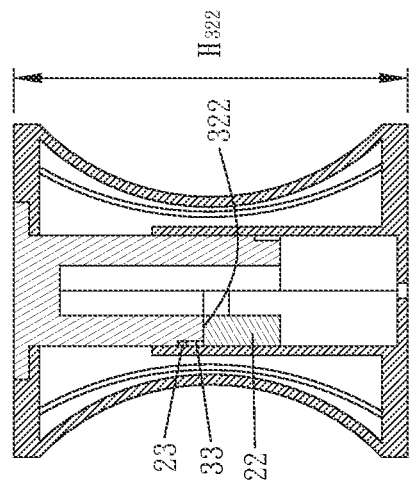
Figure 7E:
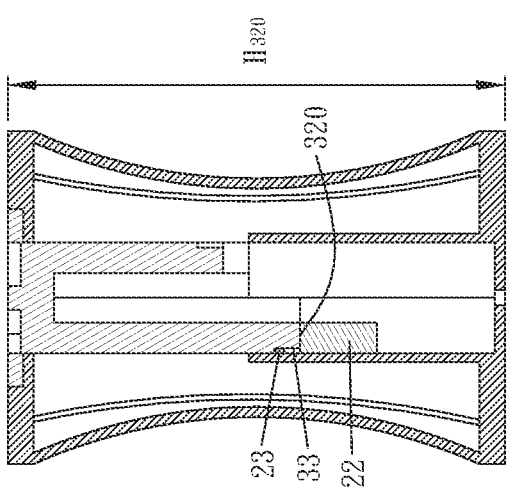
Figure 7F:
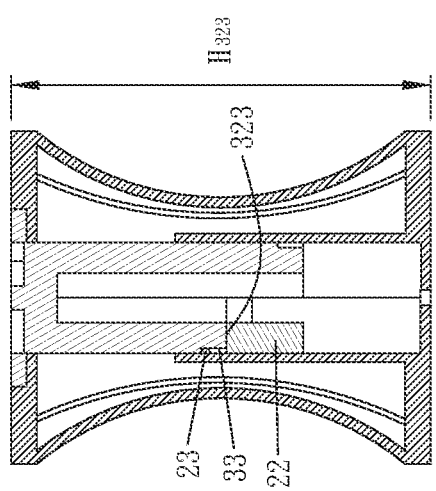

Then, the various usage states of the shock-absorbing buffer pad 1 are depicted in FIG. 7(a) FIG. 7(f). Here, "usage state" means the state when the top part 11 is subject to an overall downward force that causes downward compression of the shock-absorbing buffer pad 1. As described above, the bottom part of the inserting cylinder 32 is surrounded by staged abutting walls, which are categorized as first abutting wall 320, second abutting wall 325, third abutting wall 324, fourth abutting wall 323, fifth abutting wall 322 and sixth abutting wall 321 (see FIG. 3, FIG. 4). Therefore, when any one of the abutting walls (i.e., 320 or 325 or 324 or 323 or 322 or 321) is aligned to the stopping block 22, the overall height after compression will have different states. The different usage states are described below with reference to FIG. 7(a)~FIG. 7(f):

1. First, grip the gripping rod 311 and move the inserting cylinder 32 upward to take it out of the external compression body 10, then, turn the inserted adjusting component 30, until the internal peripheral edge of the top cap 31 marked with the number "0" is aligned to the position of the indicator 113. At this point, the first abutting wall 320 on the bottom part of the inserting cylinder 32 is aligned to the stopping block 22. Then, the inserting cylinder 32 of the inserted adjusting component 30 is again inserted into the inserting hole 112, so that the top cap 31 enters the positioning slot 111 and is fixed again. Then, when the top part 11 receives a downward force, causing the shock-absorbing buffer pad 1 to be compressed downward, as shown in FIG. 7(a), during the above process, the positioning hole 33 at an upper position outside the first abutting wall 320 will be lowered under the guide of the positioning block 23. The action of compression will be limited and stopped when the first abutting wall 320 touches the stopping block 22. The overall height record of the shock-absorbing buffer pad 1 at this point after compression is set as H320. By comparing FIG. 6 with FIG. 7(a), it is obvious that Hnor>H320.

2. If, after the inserting cylinder 32 as a whole is moved out of the external compression body 10, the inserted adjusting component 30 is turned until the internal peripheral edge of the top cap 31 marked with the number "5" is aligned to the position of the indicator 113. The state at this point is the state when the second abutting wall 325 on the bottom part of the inserting cylinder 32 is aligned to the stopping block 22. Then, the inserting cylinder 32 of the inserted adjusting component 30 is again inserted into the inserting hole 112, so that the top cap 31 enters the positioning slot 111 and is fixed again. Then, when the top part 11 receives a downward force, causing the shock-absorbing buffer pad 1 to be compressed downward, as shown in FIG. 7(b), during the process, the positioning hole 33 at an upper position outside the second abutting wall 325 will be lowered under the guide of the positioning block 23, the action of compression will be limited and stopped when the second abutting wall 325 touches the stopping block 22. The overall height record of the shock-absorbing buffer pad 1 at this point after compression is set as H325. By comparing FIG. 6, FIG. 7(a) and FIG. 7(b), it is obvious that, Hnor>H320>H325, i.e., when turning the inserted adjusting component 30 until the second abutting wall 325 is aligned to the stopping block 22, the compression stroke under external force in FIG. 7(b) is larger than that in FIG. 7(a).

3. Based on the above method of adjustment, when turning and adjusting the inserted adjusting component 30 until the internal peripheral edge of the top cap 31 marked with the number "4" is aligned to the position of the indicator 113, i.e., the third abutting wall 324 is aligned to the stopping block 22. Then, the inserting cylinder 32 of the inserted adjusting component 30 is inserted again into the inserting hole 112, so that the top cap 31 enters the positioning slot 111 and is fixed again. The top part 11 receives a downward force, causing the shock-absorbing buffer pad 1 to be compressed downward, as shown in FIG. 7(c). During the process, the positioning hole 33 at an upper position outside the third abutting wall 324 will be lowered under the guide of the positioning block 23. The action of compression will be limited and stopped immediately after the third abutting wall 324 touches the stopping block 22. The overall height record of the shock-absorbing buffer pad 1 at this point after compression is set as H324. By comparing FIG. 6 and FIGS. 7(a)-(c), it is obvious that, Hnor>H320>H325>H324, and that, when turning and adjusting the inserted adjusting component 30 until the third abutting wall 324 is aligned to the stopping block 22, the compression stroke under external force in FIG. 7(c) is larger than that in FIG. 7(b).

4. Based on the above method of adjustment, when the internal peripheral edge of the top cap 31 marked with the number "3" is aligned to the position of the indicator 113, the fourth abutting wall 323 is aligned to the stopping block 22, as shown in FIG. 7(d). The positioning hole 33 at an upper position outside the fourth abutting wall 323 is also lowered under the guide of the positioning block 23. The overall height record of the shock-absorbing buffer pad 1 is H323. By comparing FIG. 6 and FIGS. 7(a)-(d), it is obvious that, Hnor>H320>H325>H324>H323. Therefore, when adjustment is made until the fourth abutting wall 323 is aligned to the stopping block 22, the compression stroke under an external force is longer.

5. Based on the above method of adjustment, when the internal peripheral edge of the top cap 31 marked with the number "2" is aligned to the position of the indicator 113, the fifth abutting wall 322 is aligned to the stopping block 22, as shown in FIG. 7(e). The positioning hole 33 at an upper position outside the fifth abutting wall 322 is also lowered under the guide of the positioning block 23. The overall height record of the shock-absorbing buffer pad 1 is H322. By comparing FIG. 6 and FIGS. 7(a)-(e), it is obvious that, Hnor>H320>H325>H324>H323>H322. Therefore, when adjustment is made until the fifth abutting wall 322 is aligned to the stopping block 22, the compression stroke under an external force is longer.

6. At last, when the internal peripheral edge of the top cap 31 marked with the number "I" is aligned to the position of the indicator 113, the sixth abutting wall 321 is aligned to the stopping block 22, as shown in FIG. 7(f). The positioning hole 33 at an upper position outside the sixth abutting wall 321 is also lowered under the guide of the positioning block 23. The overall height record of the shock-absorbing buffer pad 1 is H321. By comparing FIG. 6 and FIGS. 7(a)-(f), it is obvious that, Hnor>H320>H325>H324>H323>H322>H321. Therefore, when adjustment is made until the sixth abutting wall 321 is aligned to the stopping block 22, the compression stroke under an external force is longest in FIGS. 7(a)-(f).

Figure 9:
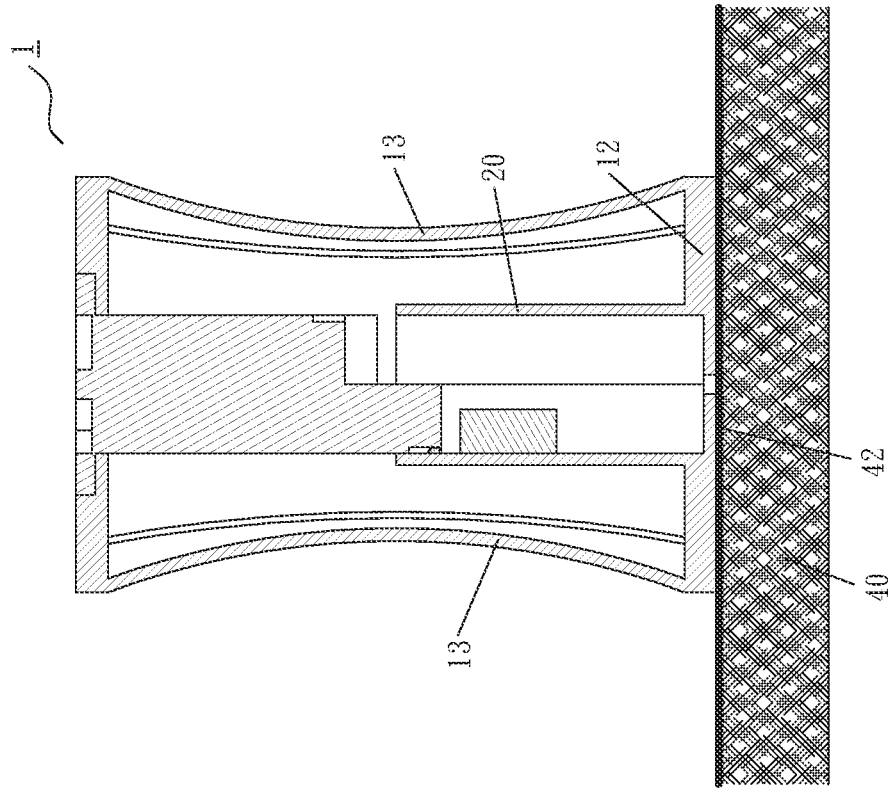
FIG. 9 is a lateral-angle sectional view of the invention bonded to the base layer through an adhesive component.
Figure 8:
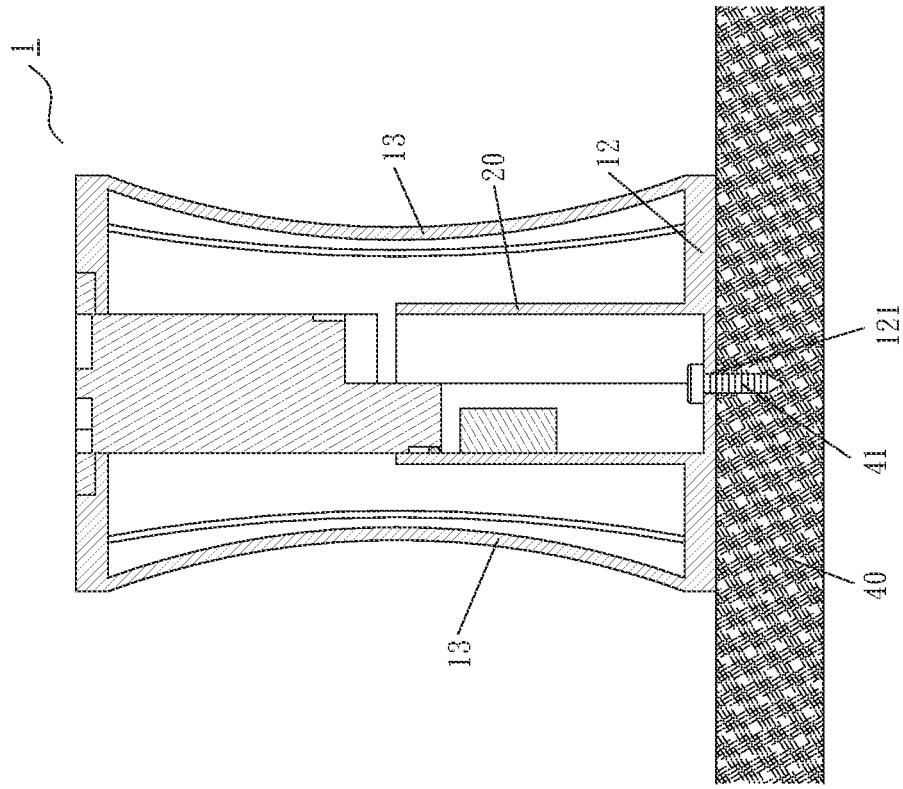
FIG. 8 is a lateral-angle sectional view of the invention bonded to the base layer through a connecting component.

The shock-absorbing buffer pad 1 of the present invention is suitable for use in combination with a base layer 40 (for example: wooden board). Therefore, as shown in FIG. 8, firstly the inserted adjusting component 30 is pulled out of the external compression body 10, and then a tool (such as a screw driver) is used to screw in a connecting component 41 (such as a screw) from the inserting hole 112, which goes through the inserting slot 21 and the connecting hole 121 and is locked with the base layer 40, so that the shock-absorbing buffer pad 1 is stably fixed on surface of the base layer 40. Alternatively, as shown in FIG. 9, an adhesive component 42 (such as double-sided adhesive tape) can be applied directly between the shock-absorbing buffer pad 1 and the base layer 40, to similarly fix the shock-absorbing buffer pad 1 on the surface of the base layer 40.

Figure 10:
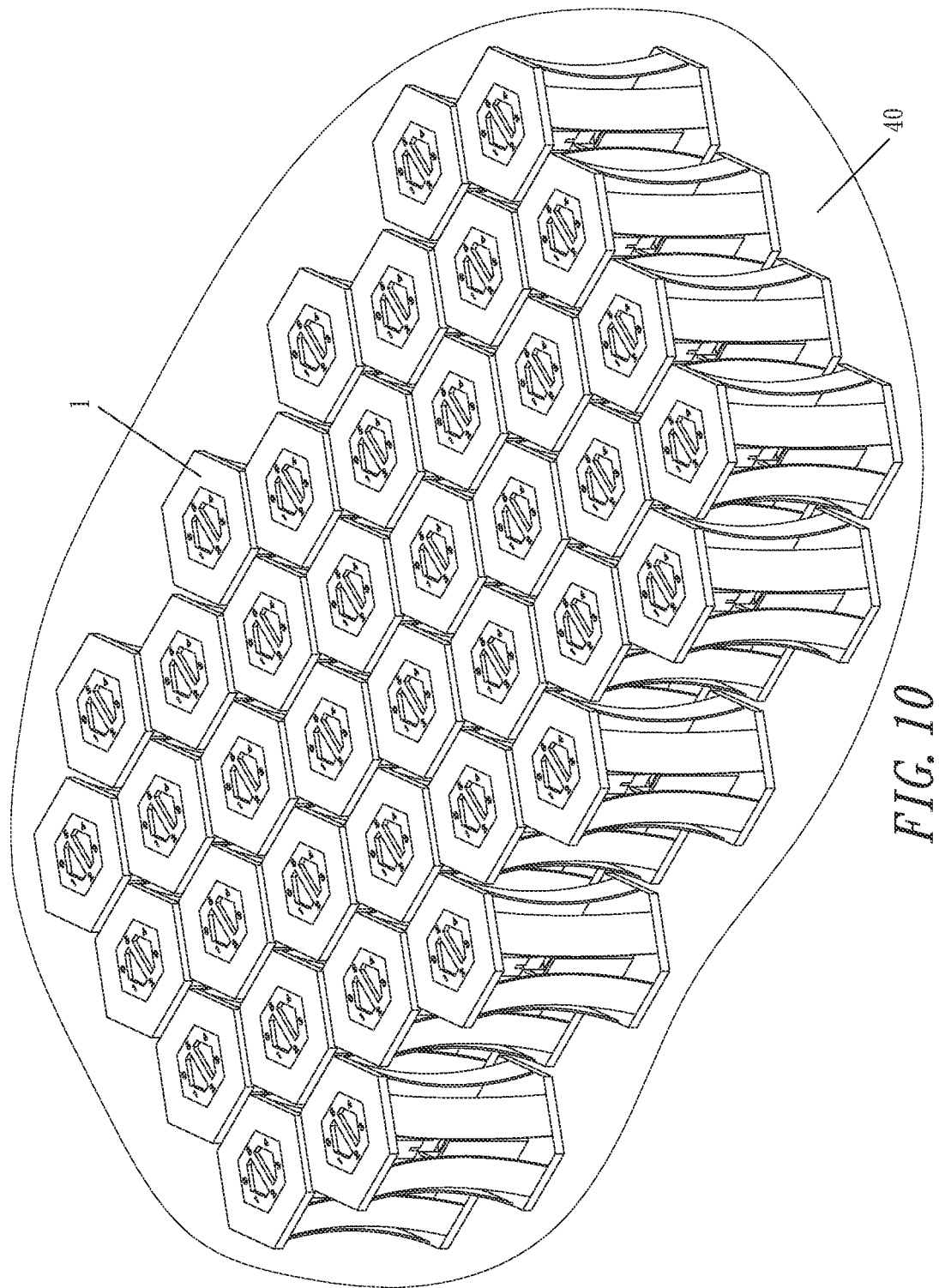
FIG. 10 is a perspective view of the invention bonded to the base layer in multiples.
Figure 11:
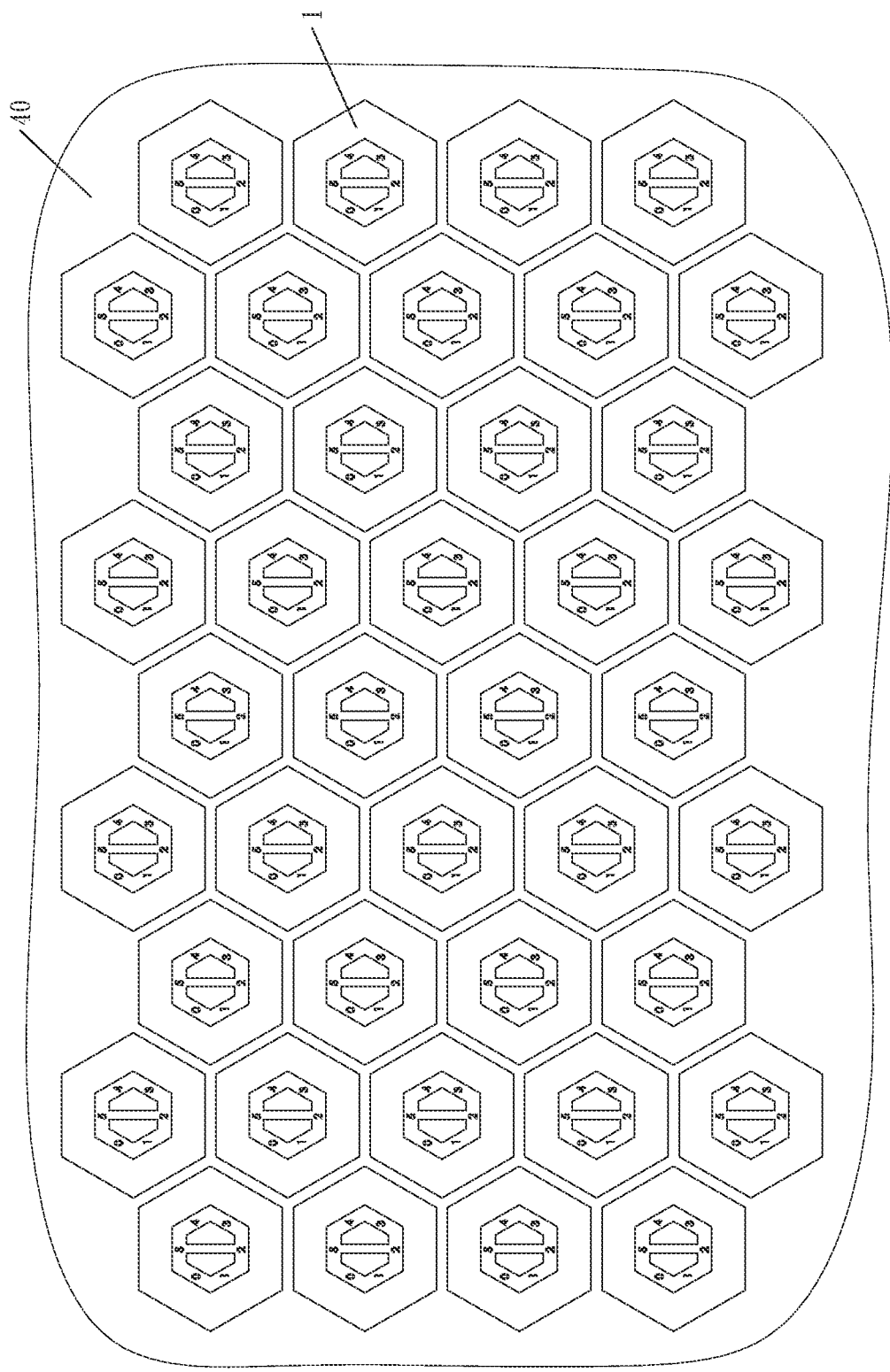
FIG. 11 is a top view of the invention bonded to the base layer in multiples.
Figure 12:
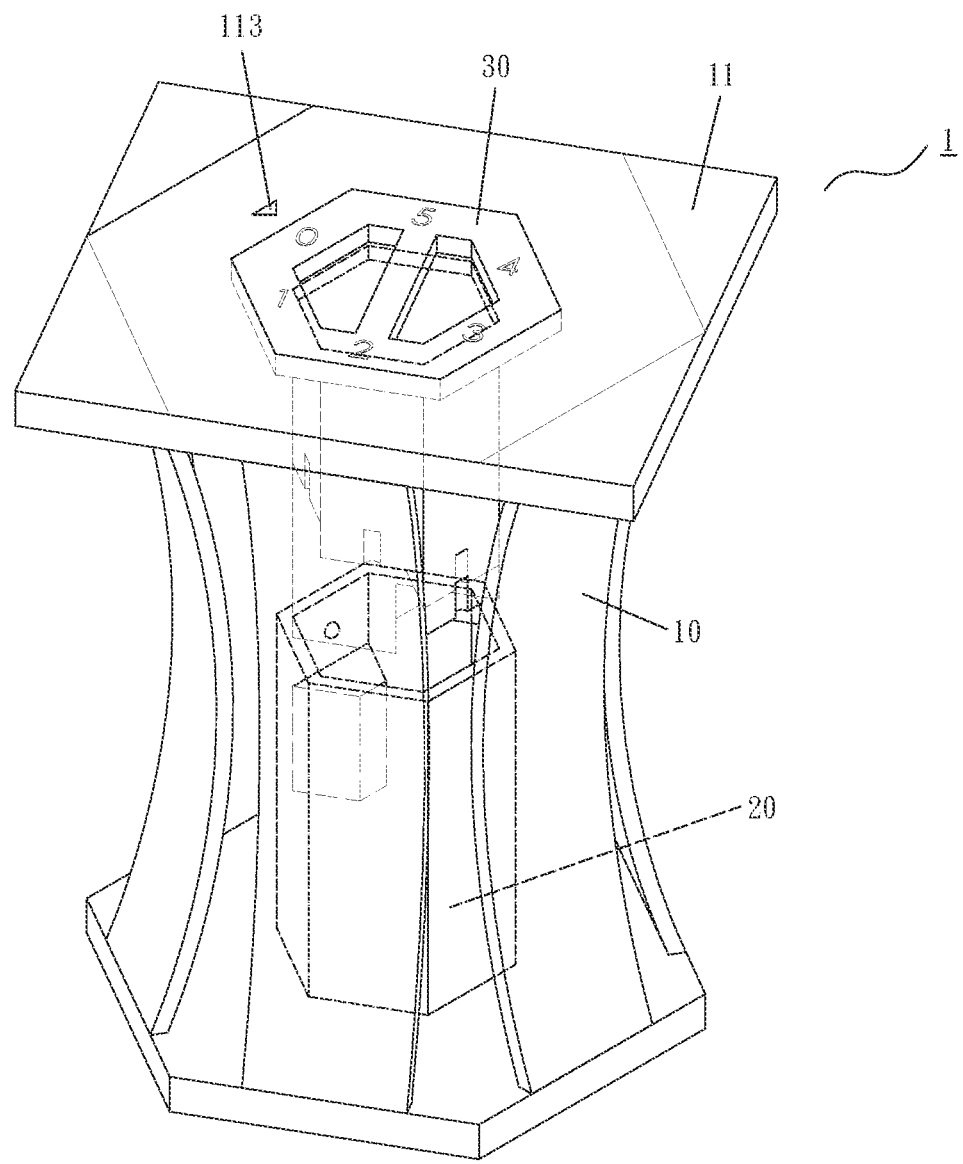
FIG. 12 is a perspective view of the invention with a square top part.
Figure 13:
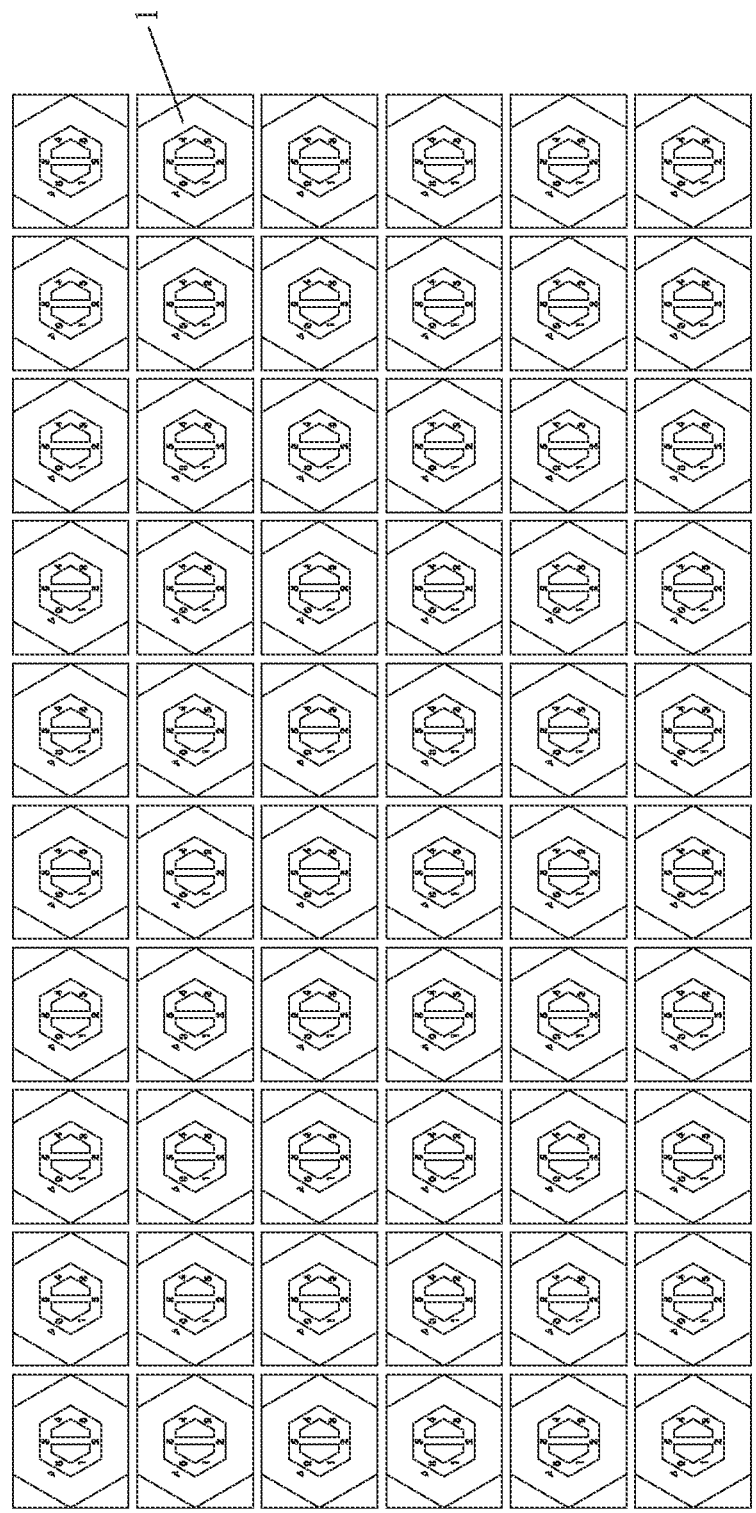
FIG. 13 is a top view of the invention with its top part being square and placed in multiples.

It is better to bond multiple shock-absorbing buffer pads of the present invention 1 with the base layer 40. As shown in FIGS. 10 and 11, a plurality of shock-absorbing buffer pads 1 are distributed on a base layer 40 (such as a wooden board) with the hexagons adjacent to each other with a small space between each other. Alternatively, the top part 11 of the shock-absorbing buffer pad 1 does not have to be hexagonal. As shown in FIG. 12, the top part 11 is formed in a square shape. Thus, as shown in FIG. 13, when arranging the plurality of shock-absorbing buffer pads 1, the array is more of square shape. Therefore, the shape of the top part 1 is not limited, and with the same functioning principle, the shape of the bottom part 12 of the shock-absorbing buffer pad 1 is also not limited.

The base layer 40 is mainly used for laying a sleeping pad for sleeping. Therefore, when using the shock-absorbing buffer pad of the present invention 1, the base layer 40 must be covered with the multiple shock-absorbing buffer pads 1 before laying the sleeping pad, and the parts of the shock-absorbing buffer pad 1 corresponding to the head, shoulder, back, waist, hip, thigh, and leg must be adjusted in advance for appropriate pressing degrees. Then, the sleeping pad is laid on the multiple shock-absorbing buffer pads L. Thus, when sleeping on the sleeping pad, the body (and the sleeping pad) will be supported by the multiple shock-absorbing buffer pads 1. Because the parts of the shock-absorbing buffer pads 1 corresponding to different parts of the body are already adjusted for different pressing degrees, the different parts of the body will feel the different supporting and cushioning forces. Then, when the pressure from sleeping is removed, due to the inverse elastic force of the compression elastic components 13, the unpressed shock-absorbing buffer pads 1 will return to its original height and state.

Generally speaking, the head, shoulder, and back part of the human body are best supported by a hard supporting and cushioning force. Therefore, the inserting cylinders 32 of the shock-absorbing buffer pads 1 corresponding to the head, shoulder, and back part of the human body are adjusted in advance to align the first abutting wall 320 or second abutting wall 325 of the bottom part to the stopping block 22. Thus, when the human body lies on the sleeping pad, the ranges of the head, shoulder, and back will sink to the position where the first abutting wall 320 or second abutting wall 325 touches the stopping block 22 and be limited. Therefore, the compression stroke is shorter, and relatively the supporting and cushioning force is harder.

For the waist and thigh parts of the human body, a medium supporting and cushioning force is more appropriate. Therefore, the inserting cylinders 32 of the shock-absorbing buffer pads 1 corresponding to the range of the waist and thigh of the human body can be adjusted to let the third abutting wall 324 or fourth abutting wall 323 of the bottom part be aligned to the stopping block 22. Thus, when the human body lies on the sleeping pad, the area corresponding to the waist and thigh parts will sink until the third abutting wall 324 or fourth abutting wall 323 touches the stopping block 22 and then be limited. This creates a medium compression stroke, and relatively a medium supporting and cushioning force. Similarly, the inserting cylinders 32 of the shock-absorbing buffer pads 1 corresponding to the hip and leg parts of the human body can be adjusted, to let the fifth abutting wall 322 or sixth abutting wall 321 of the bottom part be aligned to the stopping block 22. Thus, when the human body lies on the sleeping pad, the area corresponding to the hip and leg will sink until the fifth abutting wall 322 or sixth abutting wall 321 touches the stopping block 22 and then be limited. This creates a long compression stroke, and relatively a soft supporting and cushioning force.

Figure 14:
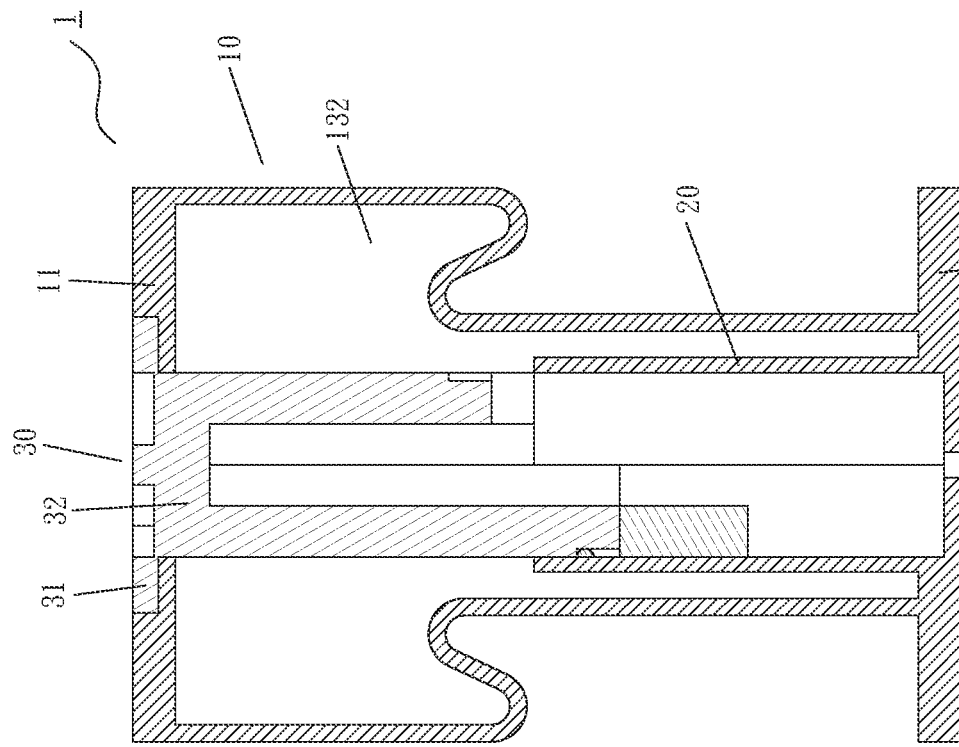
FIG. 14 is the lateral sectional view 1 of the invention with a different compression elastic component.
Figure 15:
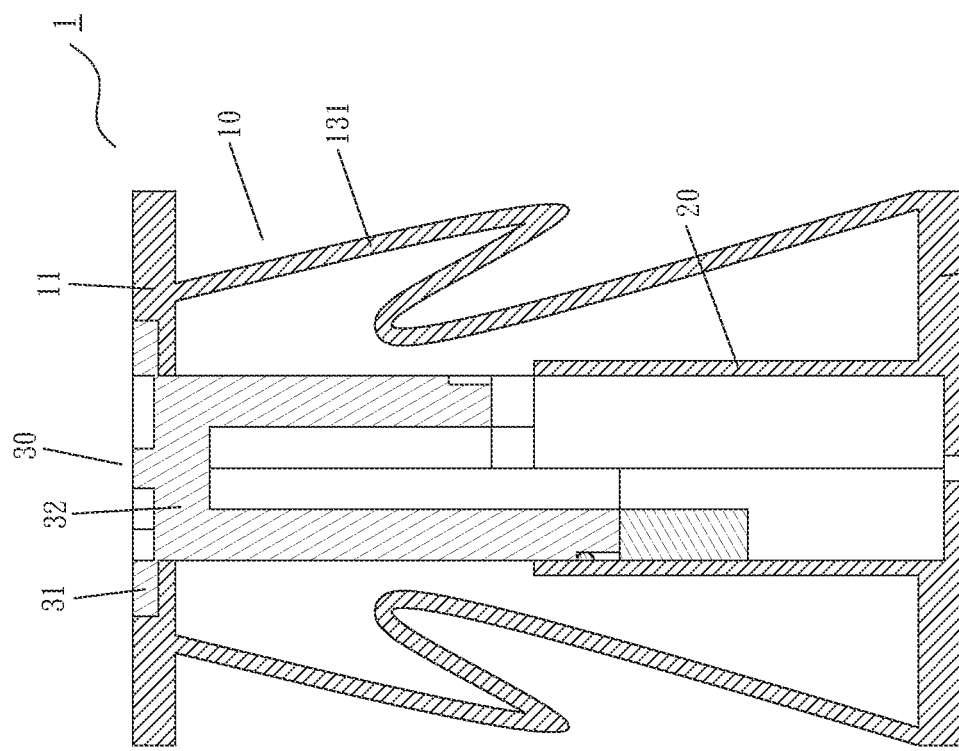
FIG. 15 is the lateral sectional view 2 of the invention with a different compression elastic component.
Figure 16:
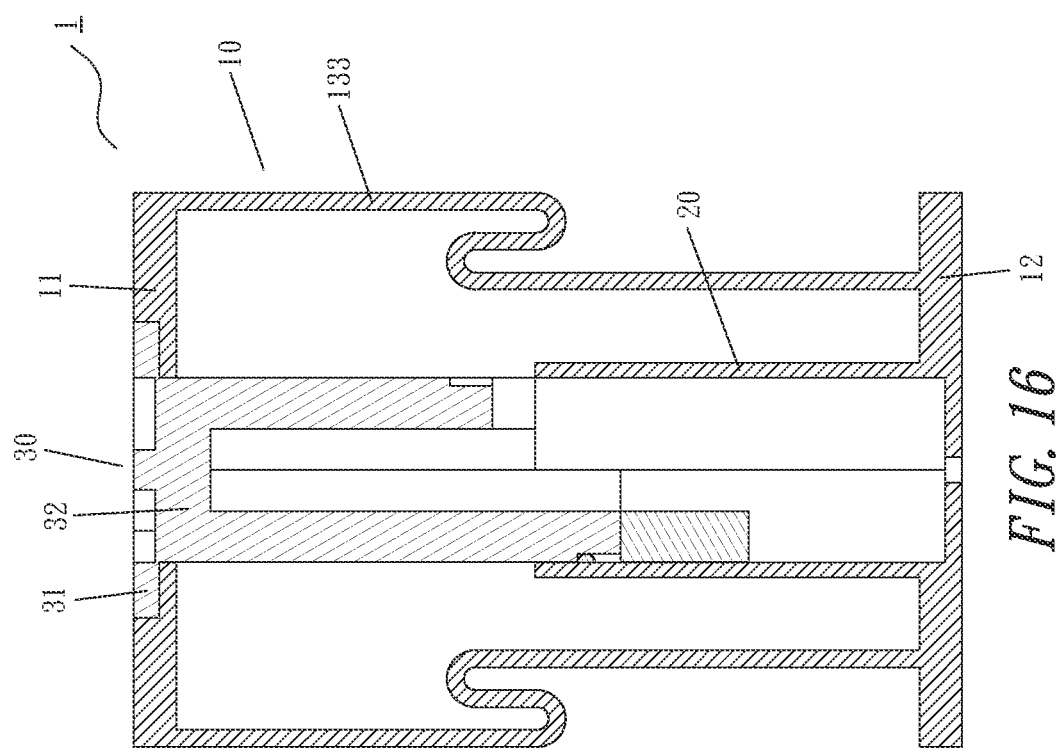
FIG. 16 is the lateral sectional view 3 of the invention with a different compression elastic component.

In the above embodiment, the compression elastic component 13 is made of a curved material tilting inward. When the top part 11 is pressed by an external force, the inward-tilting curve of the compression elastic component 13 will be intensified to accumulate an inverse elastic force. Therefore, with the same functioning principle, the compression elastic component 13 does not have to be in the design shown in FIGS. 1 to 13, other styles like the compression elastic component 131 shown in FIG. 14, or the compression elastic component 132 shown in FIG. 15, or the compression elastic component 133 shown in FIG. 16 can be applied. They can be configured separately and connected between the edges of the top part 11 and the bottom part 12. The middle section of the compression elastic component 131, 132, 133 also has a part and shape folding inward. Therefore, when the compression elastic components 131, 132, 133 are respectively connected between the edges of the top part 11 and the bottom part 12, as long as the top part 11 is pressed by an external force, the compression elastic components 131, 132, 133 will likewise have intensified folding, causing lowered height of the external compression bodies 10, and the compression elastic components 131, 132, 133 will accumulate an inverse elastic force. When the external force disappears, the inverse elastic force of the compression elastic components 131, 132, 133 will push the external compression bodies 10 to recover to its original height and state. Therefore, all compression elastic components similar to the compression elastic components 131, 132, 133 with varied designs but same structure and function fall within the patent scope of the present invention.

From the above descriptions, it can be concluded that, the main feature of the present invention is that the structure of the shock-absorbing buffer pad 1 is made up of an external compression body, an internal guide slot, and an inserted adjusting component. The external compression body has a top part, a bottom part, and a compression elastic component. The center of the top part is configured with an inserting hole going downward. The bottom part is correspondingly located beneath the top part. The compression elastic component is connected between the top part and the bottom part. The middle section of the compression elastic component has a part that is folded inward. When the top part is pressed by an external force, the compression elastic component will immediately accumulate an inverse elastic force. The internal guide slot is formed on the top surface of the bottom part of the external compression body, and is located inside the internal space of the external compression body. The internal guide slot has an inserting slot going upward. The wall body inside the inserting slot is formed with a stopping block. The inserted adjusting component has an inserting cylinder, which can be correspondingly inserted into the inserting hole of the top part. The top surface of the inserting cylinder is positioned around the inserting hole. The bottom part of the inserting cylinder is divided into multiple abutting walls. The abutting walls correspond to the stopping block.

To conclude, the shock-absorbing buffer pad of the present invention can truly accomplish the object and efficacy as expected. Before the application, such a product has not been published or in public use. Meanwhile, it indeed provides improved function and performance and has both novelty and inventive step. Therefore, an application is submitted.

What is claimed is:

1. A shock-absorbing buffer pad, comprised of an external compression body, an internal guide slot, and an inserted adjusting component, where the external compression body has a top part, a bottom part, and a compression elastic component, the top part of the external compression body is hexagonal, a center of the top part around an inserting hole has a hexagonal concave positioning slot, the center of the top part is configured with the inserting hole going downward, the inserting hole is also hexagonal, the bottom part is correspondingly located beneath the top part, the bottom part is a hexagonal plane with a center of the bottom part configured with a connecting hole, each side of hexagonal bottom part corresponding to each side of the hexagonal top part, the compression elastic component is connected between the top part and the bottom part, a middle section of the compression elastic component has a part folding inward, when the top part is pressed under an external force, the compression elastic component immediately accumulates an inverse elastic force, the internal guide slot is formed on a top surface of the bottom part of the external compression body, and is located inside an internal space of the external compression body, the internal guide slot has an inserting slot exposing upward, an internal wall of the inserting slot is formed with a stopping block, the inserted adjusting component has an inserting cylinder, which can be correspondingly inserted into the inserting hole of the top part, a top surface of the inserting cylinder is positioned around the inserting hole, a bottom part of the inserting cylinder is divided into multiple abutting walls, the multiple abutting walls correspond to the stopping block.

2. The shock-absorbing buffer pad of claim 1, wherein the top surface of the inserted adjusting component is hexagonal, a top cap can be correspondingly held inside the positioning slot of the top part and be positioned, the outer wall of one side of the positioning slot of the top part is configured with an indicator, an internal edge of each side of the top cap is marked with a number, the inserting slot of the internal guide slot has a hexagonal cross section, one of the internal walls is formed with the stopping block, the stopping block and the indicator located above are aligned in the same straight line.

3. The shock-absorbing buffer pad of claim 2, wherein a central wall of the top cap of the inserted adjusting component is concave and is transversely configured with a gripping rod for gripping.

4. The shock-absorbing buffer pad of claim 2, wherein an upper position of the stopping block is formed with a slightly convex positioning block, an upper position outside an abutting wall of the multiple abutting walls is configured with a bar-shaped and slightly concave positioning hole, the concave position and depth of the positioning hole correspond to the convex position and height of the positioning block.

5. The shock-absorbing buffer pad of claim 2, wherein the bottom part of the inserting cylinder is divided into multiple abutting walls, which respectively corresponds to a number marked on the internal edge of each side of the top cap.

6. The shock-absorbing buffer pad of claim 5, wherein the abutting walls on the bottom part of the inserting cylinder can be divided into first abutting wall, second abutting wall, third abutting wall, fourth abutting wall, fifth abutting wall, and sixth abutting wall, each abutting wall respectively corresponds to a number marked on the internal edge of each side of the top cap.

7. The shock-absorbing buffer pad of claim 1, wherein the abutting walls of the inserting cylinder bottom part are divided into first abutting wall, second abutting wall, third abutting wall, fourth abutting wall, fifth abutting wall, and sixth abutting wall, the first abutting wall has a lowest position, and the positions rise sequentially, until a highest position of the sixth abutting wall.

8. The shock-absorbing buffer pad of claim 1, wherein the top part and bottom part of the external compression body are not limited in their shapes.

\* \* \* \* \*